United States Patent
Yoo et al.

(10) Patent No.: US 7,704,678 B2
(45) Date of Patent: Apr. 27, 2010

(54) METHOD OF MANUFACTURING PRINTING PLATE AND METHOD OF MANUFACTURING LIQUID CRYSTAL DISPLAY DEVICE USING THE SAME

(75) Inventors: Soon Sung Yoo, Gunpo-si (KR); Oh Nam Kwon, Yongin-si (KR)

(73) Assignee: LG. Display Co., Ltd., Seoul (KR)

( * ) Notice: Subject to any disclaimer, the term of this patent is extended or adjusted under 35 U.S.C. 154(b) by 127 days.

(21) Appl. No.: 11/479,001

(22) Filed: Jun. 29, 2006

(65) Prior Publication Data

US 2007/0117048 A1    May 24, 2007

(30) Foreign Application Priority Data

Nov. 21, 2005   (KR)  ................. 10-2005-0111227

(51) Int. Cl.
 *B31D 3/00* (2006.01)
 *B44C 1/22* (2006.01)
 *G03F 7/26* (2006.01)
(52) U.S. Cl. ...................... 430/302; 430/310
(58) Field of Classification Search ............. 430/270.1, 430/302; 101/368
See application file for complete search history.

(56) References Cited

U.S. PATENT DOCUMENTS

| 6,106,979 | A  | * | 8/2000 | Pierrat ......................... 430/5 |
| 6,521,328 | B1 | * | 2/2003 | Lauffer et al. ............... 428/209 |
| 2005/0014093 | A1 | * | 1/2005 | Watanabe et al. ......... 430/270.1 |
| 2006/0091106 | A1 | * | 5/2006 | Kim ............................ 216/41 |
| 2006/0199394 | A1 | * | 9/2006 | Takahashi et al. ........... 438/754 |

FOREIGN PATENT DOCUMENTS

CN            1696349 A       11/2005

OTHER PUBLICATIONS

Office Action issued in corresponding Chinese Patent Application No. 200610090306.6; issued Nov. 21, 2008.

* cited by examiner

*Primary Examiner*—Cynthia H Kelly
*Assistant Examiner*—Chanceity N Robinson
(74) *Attorney, Agent, or Firm*—Brinks Hofer Gilson & Lione

(57) ABSTRACT

A method of manufacturing a precise printing plate, and a method of manufacturing an LCD device using the same are disclosed, the method of manufacturing the precise printing plate comprising forming a mask layer of a predetermined pattern on a substrate; etching the substrate with an etchant including an anionic surfactant by using the mask layer of the predetermined pattern, to thereby form a trench; and removing the mask layer.

8 Claims, 6 Drawing Sheets

METHOD OF MANUFACTURING PRINTING PLATE AND METHOD OF MANUFACTURING LIQUID CRYSTAL DISPLAY DEVICE USING THE SAME

This application claims the benefit of the Korean Patent Application No. P2005-111227, filed on Nov. 21, 2005, which is hereby incorporated by reference as if fully set forth herein.

BACKGROUND

1. Technical Field

The present invention relates to a liquid crystal display (LCD) device, and more particularly, to a method of manufacturing a printing plate used for a printing method which is one of patterning methods, and a method of manufacturing an LCD device using the same.

2. Discussion of the Related Art

Among various ultra-thin flat type display devices, which include a display screen having a thickness of several centimeters, a liquid crystal display (LCD) device can be widely used for notebook computers, monitors, aircraft, and etc. since it has advantages such as low power consumption and portability.

The LCD device includes lower and upper substrates facing each other at a predetermined interval therebetween, and a liquid crystal layer formed between the lower and upper substrates.

The lower substrate comprises a gate line, a data line, and a thin film transistor. At this time, the gate line is formed in perpendicular to the data line, to define a unit pixel region. Then, the thin film transistor is formed adjacent to a crossing of the gate and data lines, wherein the thin film transistor serves as a switching device. In addition, a pixel electrode is connected with the thin film transistor.

The upper substrate comprises a black matrix layer for shielding the gate line, the data line and the thin film transistor from light, a color filter layer formed on the black matrix layer, and a common electrode or an overcoat layer formed on the color filter layer.

The above LCD device includes various elements formed by repeated steps. Especially, a photolithography is used so as to form the elements in various shapes.

For the photolithography, it is necessary to form a pattern material layer on a substrate, to deposit a photoresist on the pattern material layer, to position a mask of a predetermined pattern above the photoresist, and to pattern the photoresist according to the predetermined pattern of the mask by exposure and development. After that, the pattern material layer is etched using the patterned photoresist as a mask.

The photolithography necessarily uses the photoresist and the mask of the predetermined pattern, to thereby increase a manufacturing cost. In addition, since the photolithography requires exposure and development, it causes a complicated process and an increasing manufacturing time.

To overcome these problems of the photolithography, a new patterning method has been developed, for example, a printing method using a printing roller.

A patterning method using a printing roller according to the related art will be described with reference to the accompanying drawings.

Figure 1A:
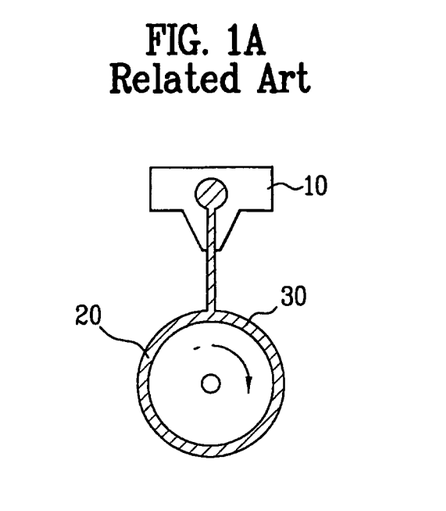
FIGS. 1A to 1C are cross sectional views of illustrating a process for patterning a predetermined material on a substrate with a printing roller according to the related art.
Figure 1B:
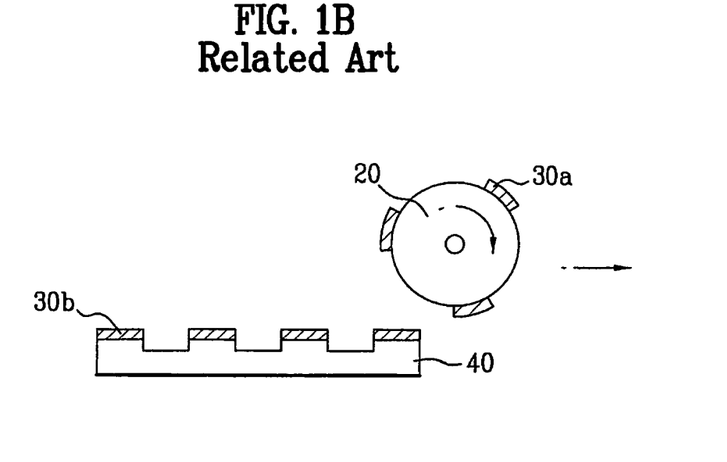
Figure 1C:
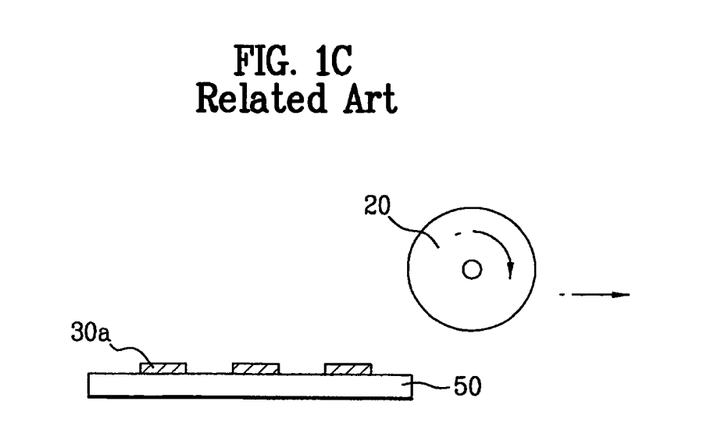

FIGS. 1A to 1C are cross sectional views of illustrating a process for patterning a predetermined material on a substrate with a printing roller according to the related art.

As shown in FIG. 1A, first, a pattern material 30 is provided through a printing nozzle 10, and is coated on a printing roller 20.

Then, as shown in FIG. 1B, the printing roller 20 coated with the pattern material 30 rolls on a printing plate 40 having a plurality of concave or convex patterns. Accordingly, some pattern material 30b is printed on the convex patterns of the printing plate 40, and the other pattern material 30a is left on the printing roller 20. That is, a predetermined form of the pattern material is formed on the printing roller 20.

Referring to FIG. 1C, as the printing roller 20 having the pattern material of the predetermined pattern rolls on a substrate 50, the pattern material 30a is printed on the substrate 50.

The patterning method using the printing roller requires the printing plate having the predetermined concave or convex patterns.

A method for manufacturing a printing plate according to the related art will be described as follows.

Figure 2A:
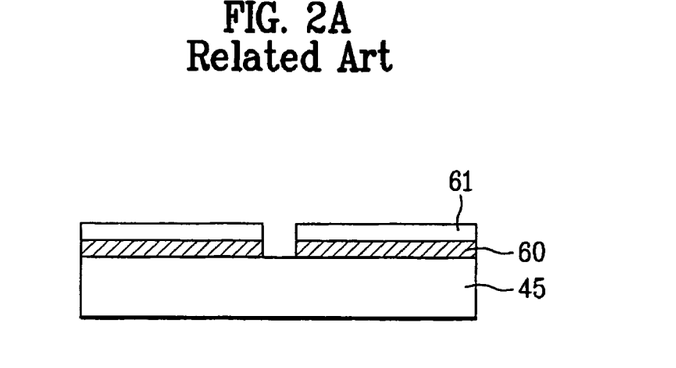
FIGS. 2A to 2C are cross sectional views of illustrating a method for manufacturing a printing plate according to the related art.
Figure 2B:
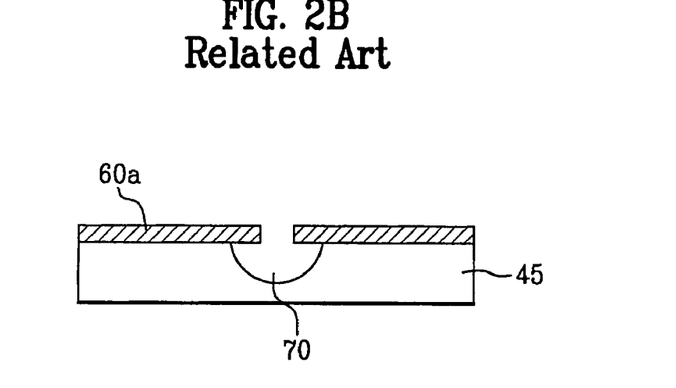
Figure 2C:
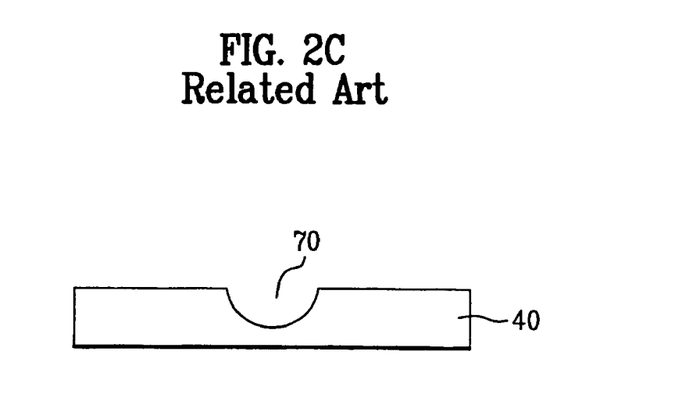

FIGS. 2A to 2C are cross sectional views of illustrating a method for manufacturing a printing plate according to the related art.

As shown in FIG. 2A, a metal layer 60 is formed on a substrate 45. Then, a photoresist 61 is formed on the metal layer 60. Thereafter, the photoresist 61 is patterned by exposure and development. Then, the metal layer is selectively removed using the patterned photoresist 61 as a mask, to thereby form a mask layer 60a of a predetermined pattern.

Referring to FIG. 2B, after removing the photoresist 61, the substrate 45 is isotropically etched using the mask layer 60a, to thereby form a trench 70 in the substrate 45. At this time, the substrate 45 is etched in the isotropic method of wet-etching. Accordingly, some portions of the substrate 45 under the mask layer 60a may be removed since the substrate 45 is etched in a horizontal direction as well as in a vertical direction, thereby generating an undercut phenomenon.

Referring to FIG. 2C, the mask layer 60a is removed to thereby form a printing plate 40.

However, the method of manufacturing the printing plate according to the related art has the following disadvantages.

Figure 3:
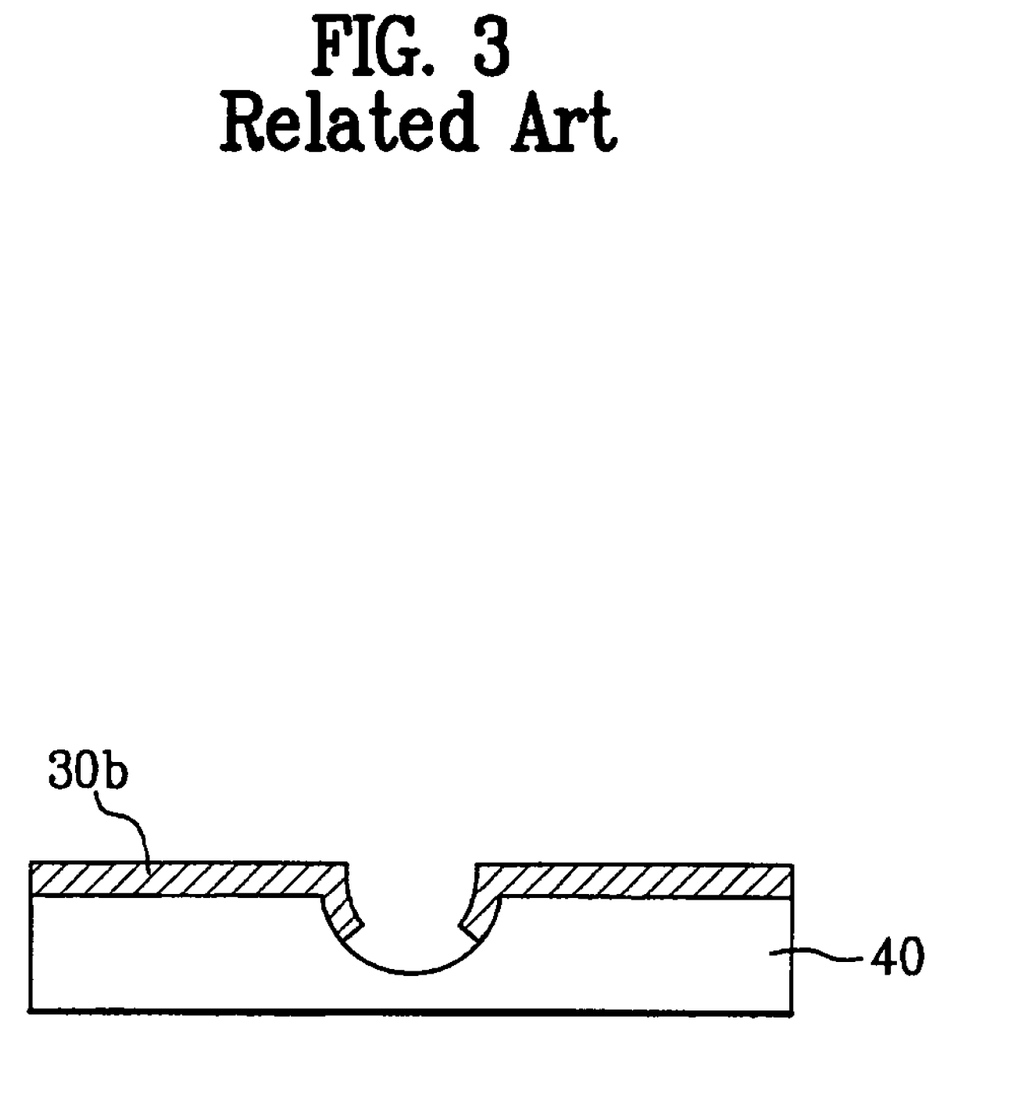
FIG. 3 is a cross sectional view of illustrating a problem generated when forming a predetermined pattern using a printing plate according to the related art.

FIG. 3 is a cross sectional view of explaining a problem generated when forming the pattern with the printing plate according to the related art.

As explained in FIG. 2B, when forming the trench 70, the substrate 45 is isotropically etched. That is, the substrate 45 is etched in the horizontal direction as well as in the vertical direction, whereby the inner side surface of the trench 70 has a gentle slope.

Accordingly, when printing the pattern material 30b on the printing plate 40, the pattern material 30b is printed on the edges and inner surfaces of the trench 70. That is, it is difficult to print the precisely desired pattern on the printing roller 20.

SUMMARY

Accordingly, the present invention is directed to a method of manufacturing a precise printing plate, and a method of manufacturing an LCD device using the same, which substantially obviates one or more problems due to limitations and disadvantages of the related art.

Additional advantages, and features of the invention will be set forth in part in the description which follows and in part will become apparent to those having ordinary skill in the art upon examination of the following or may be learned from practice of the invention. The advantages of the invention may be realized and attained by the structure particularly pointed out in the written description and claims hereof as well as the appended drawings.

To achieve these and other advantages and in accordance with the purpose of the invention, as embodied and broadly described herein, a method for manufacturing a printing plate includes forming a mask layer having at least one opening on a substrate. The substrate is etched with an etchant including an anionic surfactant by using the mask layer as a mask to thereby form at least one trench. After forming the trench, the mask layer is removed.

In another aspect of the present invention, a method for manufacturing an LCD device includes preparing a at least one printing plate having concave or convex patterns formed by selectively etching a plate substrate with an etchant including an anionic surfactant. A black matrix layer is formed on a first substrate and a color filter layer is formed on the first substrate an a portion of the black matrix layer. The first substrate and a second substrate are bonded to each other at a predetermined interval therebetween. At least one of the black matrix layer and the color filter layer is formed using the printing plate. In another aspect of the present invention, a method for manufacturing an LCD device comprises preparing at least one printing plate having concave or convex portions formed by selectively etching a substrate with an etchant including an anionic surfactant; forming a material layer on a TFT substrate, the material layer configured to form a component of the TFT substrate; forming a photoresist pattern on the material layer using the at least one printing plate; and forming the component by etching the material layer using the photoresist pattern as an etching mask.

In yet another aspect of the invention, a method for manufacturing a printing plate includes providing a plate substrate and forming a metal mask layer having at least one opening on a plate substrate. The substrate is etched with an etchant including an anionic surfactant using the metal mask layer as an etch mask, to thereby form at least one trench. The anionic surfactant adheres to the metal mask during etching and the metal mask layer is removed after the etching process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a method for manufacturing a printing plate and a method for manufacturing an LCD device according to the present invention will be described with reference to the accompanying drawings.

Figure 4A:
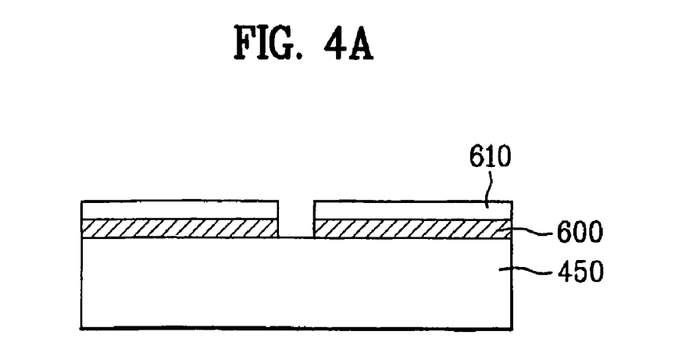
FIGS. 4A to 4C are cross sectional views of illustrating a process for manufacturing a printing plate according to the present invention.
Figure 4B:
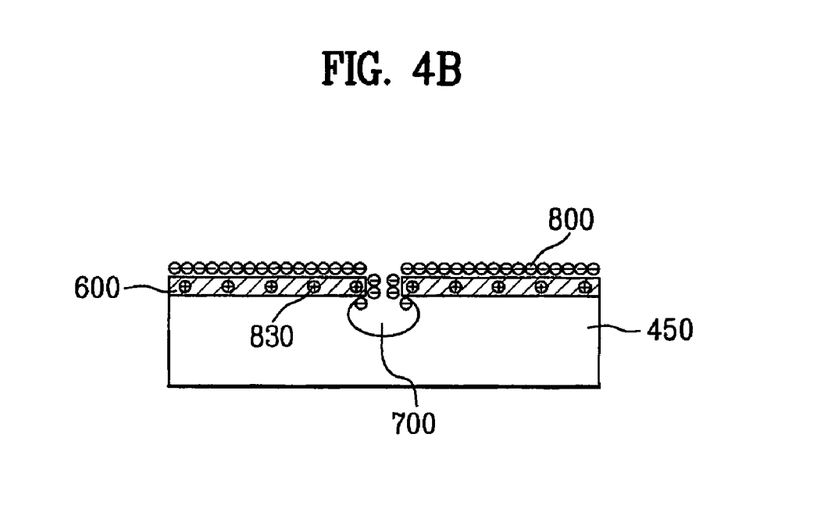
Figure 4C:
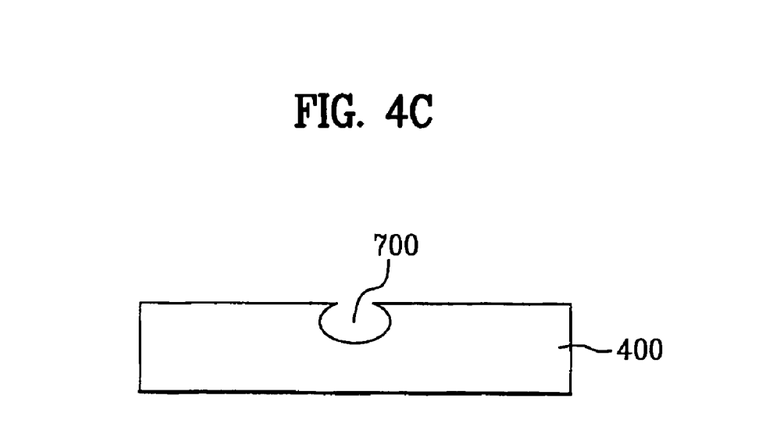

FIGS. 4A to 4C are cross sectional views of illustrating a method for manufacturing a printing plate according to the present invention.

First, as shown in FIG. 4A, a metal layer is formed on a substrate 450, and a photoresist 610 is formed on the metal layer. Then, the photoresist 610 is patterned by exposure and development. Thereafter, the metal layer is selectively removed using the patterned photoresist 610 as a mask, thereby forming a mask layer 600 having at least one opening. The metal layer may be formed in a single-layered or dual-layered structure using chrome Cr, molybdenum Mo, copper Cu, or indium-tin-oxide (ITO).

As shown in FIG. 4B, after removing the photoresist 610, the substrate 450 is isotropically etched with an etchant including an anionic surfactant 800 by using the mask layer 600 as an etching mask, to thereby form at least one trench 700 in the substrate 450. That is, the etchant may be a fluoric acid (HF) solution including the anionic surfactant 800, or a mixture of a ammonium fluoride ($NH_4F$) and a fluoric acid (HF) solution including the anionic surfactant 800, for etching of the substrate 450.

As the anionic surfactant 800 is in contact with the exposed portion of the mask layer 600, the anionic surfactant 800 is adhered onto the surface of the mask layer 600 by positive charges induced in the surface of the mask layer 600. Accordingly, it is possible to prevent horizontal etching in the substrate 450.

As shown in FIG. 4C, the mask layer 600 is removed to thereby form a printing plate 400. That is, the trench is formed in the predetermined portion of the substrate, whereby the printing plate has concave or convex pattern.

That is, the substrate 450 is etched by the etchant including the anionic surfactant 800. Accordingly, since the anionic surfactant 800 adheres to the exposed portions of the mask layer 600, the side slope of the trench formed in the substrate 450 is nearly vertical. As a result, in case of printing the pattern material on the printing plate, the pattern material is not printed on the edge and inner surfaces of the trench 700, to thereby obtain the precise pattern.

A method for manufacturing an LCD device using the printing plate according to the present invention will be described as follows.

FIGS. 5A to 5D are cross sectional views of illustrating a method for manufacturing an LCD device according to the present invention. FIGS. 6A to 6C are cross sectional views of illustrating a method for forming a black matrix layer or a color filter layer of an LCD device with a printing plate according to the present invention.

Figure 5A:
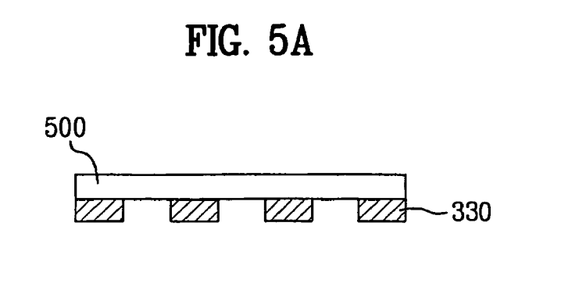
FIGS. 5A to 5D are cross sectional views of illustrating a method for manufacturing an LCD device according to the present invention.
Figure 6A:
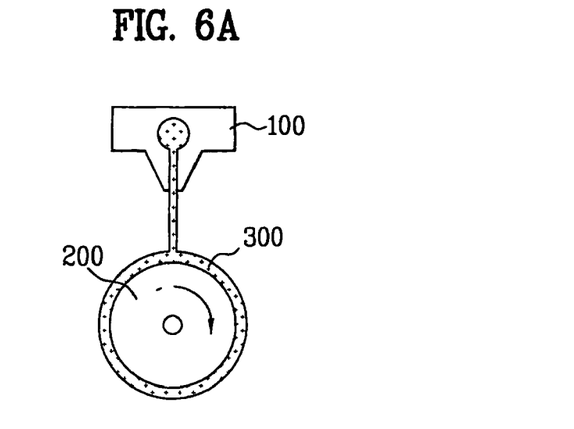
FIGS. 6A to 6C are cross sectional views of illustrating a process for patterning a predetermined material using a printing plate according to the present invention.
Figure 6B:
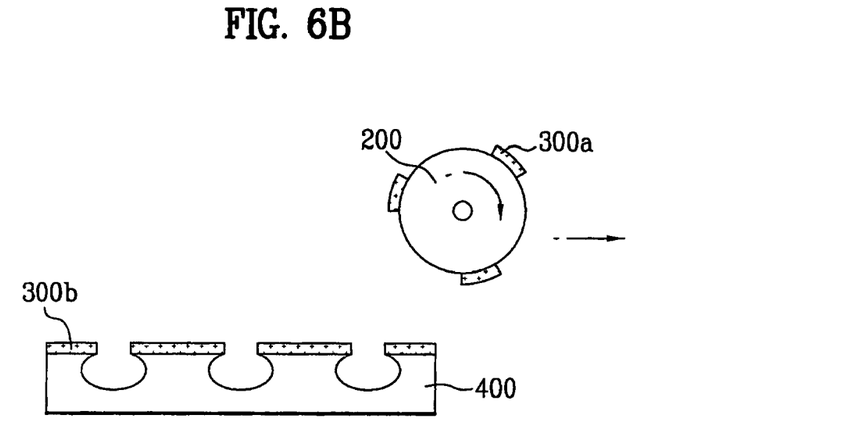
Figure 6C:
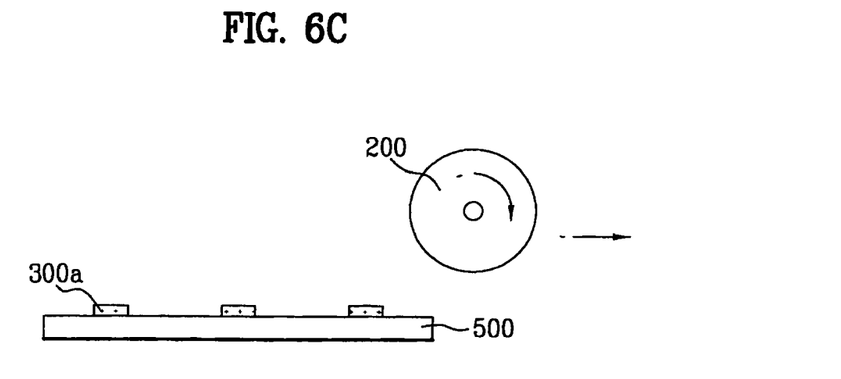

As shown in FIG. 5A, a black matrix layer 330 is formed on a first substrate 500 of a color filter array substrate. At this time, the black matrix layer 330 is provided to prevent a light from leaking in other portions except pixel regions.

Figure 5B:
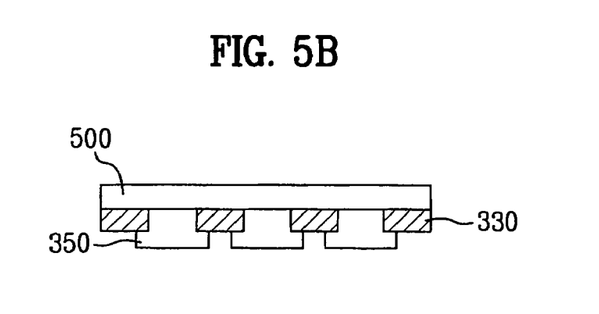

As shown in FIG. 5B, a color filter layer 350 is formed on the first substrate 500 including the black matrix layer 330. At this time, at least one of steps for forming the black matrix layer 330 (FIG. 5A) and forming the color filter layer 350 (FIG. 5B) uses the above-mentioned printing plate, so as to form the black matrix layer 330 or/and color filter layer 350.

That is, a preferable method for forming the pattern with the above-mentioned printing plate will be explained with reference to FIGS. 6A to 6C.

As shown in FIG. 6A, a pattern material 300 (for example, a light shielding material or a color filter material) is supplied through a printing nozzle 100, and is coated on a printing roller 200.

Referring to FIG. 6B, the printing roller 200 coated with the pattern material 300 rolls on the printing plate 400 manufactured by the above-mentioned method, so as to print some pattern material 300b on the convex patterns of the printing plate 400 and to leave a remaining pattern material.

As shown in FIG. 6C, the printing roller 200 rolls on the substrate 500, so as to print the remaining pattern material 300a on the substrate 500.

According to the method of FIGS. 6A to 6C, the black matrix layer 330 or/and color filter layer 350 is formed on the substrate 500.

A patterning method using the printing plate manufactured by the above method according to the preferred embodiment of the present invention may be applied to a step for preparing a second substrate 550.

Referring back to FIG. 5C, the second substrate 550 is prepared. Although not shown, and as is known in the art, the second substrate 550 is comprised of gate and data lines crossing each other to define a unit pixel region, a thin film transistor TFT formed adjacent to a crossing of the gate and data lines, and a pixel electrode formed in the pixel region and connected with the thin film transistor TFT.

In accordance with an embodiment, all elements of the TFT substrate including the gate lines, data lines, pixel electrodes, active layers, and passivation layer of the TFT substrate can be formed using a form of the process illustrated in FIGS. 6A-6C. For example, at least one of more elements on the TFT substrate, an additional substrate is fabricated having the features shown in substrate 400.

In order to form the features of the TFT substrate, a printing plate is formed using the process described above. The dimensions of the structures on the printing plate are changed from that shown for the color filter process to accommodate the feature sizes of the data lines, gate lines, pixel electrodes, and the like on the TFT substrate. The process is carried out using the steps shown in FIGS. 6A-6C, but the printing plate is configured for the feature sizes of the various components in the TFT substrate.

For example, a method for forming the gate lines using the printing plate according to the present invention will now be described.

A metal layer for forming the gate lines is formed on the second substrate 550. A photoresist is provided through a printing nozzle, and is coated on a printing roller.

Then, the printing roller having the photoresist coated thereon rolls on a printing plate for patterning the gate lines as shown in FIG. 6A or 6B, whereby the photoresist is printed on the printing plate for patterning the gate lines and the photoresist remains on the printing roller.

As the printing roller rolls on the second substrate 550 including the metal layer, and the remaining photoresist on the printing roller is printed onto the metal layer as shown FIG. 6c.

The metal layer is selectively removed by etching the metal layer using the photoresist as a mask, to thereby form the gate lines.

According to the method shown in FIGS. 6A to 6C, a photoresist may be coated on the printing roller 200, to thereby form the photoresist pattern for forming the data lines, the pixel electrodes, the active layers, or the passivation layer on the second substrate 550.

Therefore, the illustrative embodiment of the present invention advantageously does not use a photolithography process.

Figure 5C:
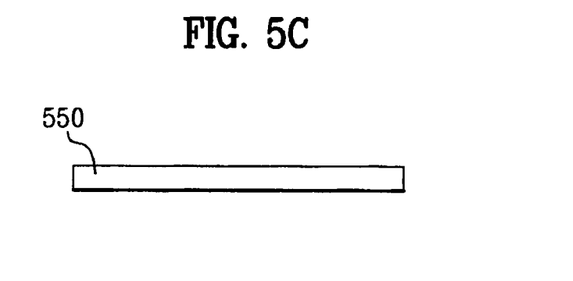

As shown in FIG. 5C, the second substrate 550 of a thin film transistor array substrate is provided in opposite to the first substrate 500.

Although not shown, but as known to those skilled in the art, the second substrate 550 includes gate and data lines crossing each other to define a pixel region, a thin film transistor formed adjacent to a crossing of the gate and data lines, and a pixel electrode connected with the thin film transistor.

Figure 5D:
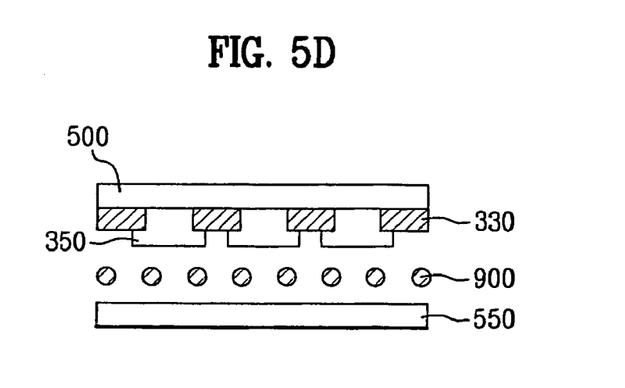

After that, as shown in FIG. 5D, the first and second substrates 500 and 550 are bonded to each other at a predetermined intervals therebetween, and a liquid crystal layer 900 is formed between the first and second substrates 500 and 550.

At this time, the liquid crystal layer 900 may be formed in a dispensing method or an injection.

When applying the dispensing method, a sealant having no inlet is formed in any one of the first and second substrates, and liquid crystal is dispensed on any one of the first and second substrates, and then the two substrates are bonded to each other.

Alternatively, in the case of applying the injection method, after bonding the two substrates with a sealant having an inlet, liquid crystal is injected to a space between the first and second substrates by capillary phenomenon and pressure difference.

As mentioned above, the method for manufacturing the printing plate and the method for manufacturing the LCD device according to the present invention have the following advantages.

To manufacture the printing plate, after the metal mask layer is firstly formed, the substrate is etched by the etchant comprising the anionic surfactant. Accordingly, the anionic surfactant is adhered to the exposed portion of the mask layer, so that it is possible to prevent the etching of horizontal direction in the substrate. As a result, the narrow and deep trench can be formed in the printing plate, to thereby form the precise pattern. Especially, the above method of the present invention is useful to manufacture the thin film transistor requiring the precise pattern.

Also, the side surface of the trench has the gentle slope which is nearly horizontal. Accordingly, it is possible to prevent the pattern material from being printed on the edge and inner surface of the trench, to thereby form the precise pattern. The above method substitutes for the expensive photolithography, thereby decreasing the manufacturing cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing a printing plate comprising:
forming a mask layer having at least one opening on a substrate;
etching the substrate with an etchant including an anionic surfactant using the mask layer as an etch mask, to thereby form at least one trench, wherein the anionic surfactant is adhered to a surface of the mask layer so that the anionic surfactant prevents the at least one trench from being etched horizontally; and
removing the mask layer,
wherein the step of forming a mask layer comprises: sequentially forming a metal layer and a photoresist on the substrate; patterning the photoresist by exposure and development; etching the metal layer using the patterned photoresist as an etch mask, to thereby form the at least one opening; and removing the patterned photoresist.

2. The method of claim 1, wherein forming a mask layer comprises forming a single-layered or dual-layered structure using chrome Cr, molybdenum Mo, copper Cu, or indium-tin-oxide (ITO).

3. The method of claim 1, wherein the etchant comprises a fluoric acid (HF) solution including the anionic surfactant.

4. The method of claim 1, wherein etching the substrate with an etchant comprises etching with a mixture of a fluoric ammonium ($NH_4F$) and a fluoric acid (HF) solution including the anionic surfactant.

5. A method for manufacturing a printing plate comprising:
providing a plate substrate and forming a metal mask layer having at least one opening on a plate substrate;
etching the substrate with an etchant including an anionic surfactant using the metal mask layer as an etch mask, to thereby form at least one trench, wherein the anionic surfactant adheres to the metal mask during etching the substrate; and
removing the metal mask layer,
wherein the step of etching the substrate comprises: inducing positive charge in the surface of the metal mask layer, adhering the anionic surfactant onto the surface of the metal mask layer and the anionic surfactant prevents the at least one trench from being etched horizontally.

6. The method of claim 5, wherein forming a metal mask layer comprises forming layer comprising one or more of chrome, molybdenum, copper, and indium-tin-oxide.

7. The method of claim 5, wherein the etchant comprises a fluoric acid (HF) solution including the anionic surfactant or a mixture of a fluoric ammonium ($NH_4F$) and a fluoric acid (HF) solution including the anionic surfactant.

8. The method of claim 5, wherein etching the substrate comprises forming a trench in the substrate, wherein the anionic surfactant prevents substantial lateral etching of the plate substrate.

* * * * *